United States Patent [19]

Check et al.

[11] Patent Number: 4,739,145
[45] Date of Patent: Apr. 19, 1988

[54] SYSTEM FOR POSITIONING AND TRANSFERRING EDM ELECTRODES

[75] Inventors: John M. Check, Chelsea; William L. Clayton, Jr., Fowlerville; Frederick L. Fitts, Ann Arbor; Thomas D. Walser, Chesaning, all of Mich.

[73] Assignee: Ex-Cell-O Corporation, Walled Lake, Mich.

[21] Appl. No.: 848,506

[22] Filed: Apr. 7, 1986

[51] Int. Cl.$^4$ .................... B23H 7/26; B23Q 3/155
[52] U.S. Cl. .................... 219/69 E; 29/568; 219/69 R; 408/35
[58] Field of Search .............. 219/68, 69 R, 69 M, 219/69 E, ; 29/26 A, 568; 408/35; 211/1.5; 279/1 TS; 204/297 R

[56] References Cited

U.S. PATENT DOCUMENTS

| | | | |
|---|---|---|---|
| 3,332,142 | 7/1967 | Lehmkuhl et al. | 279/1 TS |
| 4,306,350 | 12/1981 | Kielma et al. | 211/1.5 |
| 4,419,807 | 12/1983 | Moulin | 408/35 |
| 4,514,892 | 5/1985 | Tsujimura et al. | 211/1.5 |
| 4,523,367 | 6/1985 | Burkhardt et al. | 211/1.5 |
| 4,563,800 | 1/1986 | Bonga | 219/69 R |
| 4,590,662 | 5/1986 | Norota | 211/1.5 |
| 4,596,066 | 6/1986 | Inoue | 219/69 E |
| 4,633,053 | 12/1986 | Purthran | 219/69 R |
| 4,654,954 | 4/1987 | Bayes et al. | 211/1.5 |

FOREIGN PATENT DOCUMENTS

| | | | |
|---|---|---|---|
| 132599 | 2/1985 | European Pat. Off. | 29/568 |
| 3431349 | 3/1986 | Fed. Rep. of Germany | 29/563 |
| 2163380 | 2/1986 | United Kingdom | 219/69 E |

*Primary Examiner*—Philip H. Leung
*Assistant Examiner*—Geoffrey S. Evans
*Attorney, Agent, or Firm*—John C. Evans

[57] ABSTRACT

In a multiple axis electrical discharge machine having a pair of indexable turrets each of which carries a plurality of electrode cartridges each with a supply of electrodes, the improvement of individually releasable electrodes in each cartridge which are configured to be transferred to a tool holder to be precisely positioned therein; the machine further includes a programmable electrode tool holder carousel and opposed tool carriers for moving preselected combinations of tool holders and electrodes between an electrode transfer station and a tool changer for transferring the selected electrode to a servo driven spindle head.

18 Claims, 10 Drawing Sheets

SYSTEM FOR POSITIONING AND TRANSFERRING EDM ELECTRODES

TECHNICAL FIELD

This invention relates to electrical discharge machines and more particularly to such machines having automated electrode changer systems with on-line flexible EDM machining capabilities.

PRIOR ART

Electrode tool cartridges have been incorporated in prior electrical discharge machines to extend the on-line time of machine operation. An example of such cartridges is set forth in U.S. Ser. No. 382,831 filed May 27, 1982 to Raycon Corporation, a wholly-owned subsidiary of the assignee of this application. EDM machines have incorporated tool transfer apparatus to move electrode tools from a storage area to a holder on a servo head. See U.S. Pat. No. 4,316,071 issued Feb. 16, 1982. A multiple head spindle has been used in electrical discharge machine for carrying different types of electrodes to a work station and the multiple head has been operated to select a given electrode type for a particular machining step. An example of such a machine is disclosed in U.S. Pat. No. 4,459,190 issued July 10, 1984.

Such machines do not provide selectable streams of electrodes to increase the time that an EDM machine can be automatically run. Further, they do not provide means which permit continuous selection of one of a plurality of different electrodes from the selected streams while machining operations continue. For purposes of this specification, the phrase "stream of electrodes" means a stack of individual electrodes which are stacked one on another and which are movable individually from the stack for use in an EDM machine. Further prior electrode transfer systems have not addressed the problem of transfer of electrodes from an electrode supply cartridge to a tool holder storage magazine by means which are selectively operated to select one of a plurality of tool holders for connection to a servo-driven head in accordance with flexible manufacturing requirements.

The use of tool storage magazines and methods for tool transfer from the magazines to a spindle have also been suggested for use in the mechanical metal cutting tool industry. Such systems, however, are configured to accommodate standard metal cutting tools and do not consider the possibility of adjusting the tool head itself, for example, by automatic replacement of cutting inserts on a mill head or automatic replacement of drill edges on a drill bit.

The present invention is directed to an EDM electrode supply and transfer system that includes a high capacity reservoir defined by plural electrode cartridges. Means are provided for transferring replacement electrodes to and from one of a plurality of programmably selectable tool holders and further means are provided for transferring a selected combination of tool holder and electrode to a homepositioned servo head of an electrical discharge machine.

The invention further provides a unique electrode transfer and tool holder/electrode selection method and system that has a magazine system and clamp means which operate to hold the electrode on the transfer carriage prior to actual transfer movement of individual replacement electrodes from a cartridge to an electrode clamp on a tool holder and which locks the transferred electrode to the tool holder's electrode clamp prior to retraction of the transfer carriage.

Further, the invention provides a method and means for transferring a selected replacement electrode to a clamp on a tool holder in a single electrode transfer plane and with a single actuator operative to produce the staged electrode clamping of the preceding paragraph.

Another aspect of the invention is a method of electrode selection in a multiple operation electrical discharge machine which includes the steps of providing a plurality of large capacity electrode cartridges and further providing a plurality of electrodes in each cartridge characterized by each having a common designed base that includes track and location means thereon; advancing the electrode bases within the cartridge on the tracks and separating each electrode from the cartridge by first grasping the location means and then clamping the electrode base on a tool holder prior to any electrode movement or release A further aspect of the method is to provide a single drive cylinder to feed the tool holder.

A further aspect is to provide tool holders on a rotary programmable electrode selection carriage that is operated independently of the movement of a selected electrode at the electrode transfer station.

A further feature of the present invention is the provision of a rotary indexable drum arranged on a horizontal axis and including a plurality of electrode cartridges thereon positioned in alignment with an electrode transfer plane and wherein the electrode transfer plane intersects an independently operated tool holder carousel disc with tool holders that are configured to receive base segments of conductive electrodes and are operated to engage the base segments during electrode transfer and wherein previously combined tool holder and electrode types are carried by the disc and selected on a programmable basis. A further feature is to provide spaced carriers including cylinders arranged on a straight transfer line arranged perpendicular to the electrode transfer plane to define a compact electrode transfer envelope between the electrode cartridge and a two-position oscillatable tool changer arm for loading/unloading a previously combined tool holder/electrode combination on a servo-driven head of an EDM machine.

Another advantage of the present invention is the provision of a uniquely configured conductive electrode with a base having slide transfer slots for combination with a tracked electrode magazine and stripper mechanism and further including holes adapted for engagement with a tool holder clamp for seating an electrode on close tolerance reference surfaces on the tool holder.

These and other objects of the present invention will be apparent from the following description and accompanying drawings.

BRIEF DESCRIPTION OF THE DRAWINGS

FIG. 2 is a top elevational view of one side of the machine shown in FIG. 1 looking in the direction of arrow 2 in FIG. 1;

FIG. 3 is an enlarged sectional view taken along the line 3—3 of FIG. 2 looking in the direction of the arrows;

FIG. 4 is a sectional view taken along the line 4—4 of FIG. 3 looking in the direction of the arrows;

FIG. 9 is a cross-sectional view taken along the line 9—9 of FIG. 4 looking in the direction of the arrows;

FIG. 10 is a cross-sectional view taken along the line 10—10 of FIG. 9 looking in the direction of the arrows;

FIG. 25 is a fragmentary side elevational view of the electrode tool holder and electrode injector at an electrode transfer station;

BEST MODE OF CARRYING OUT THE INVENTION

Figure 1:
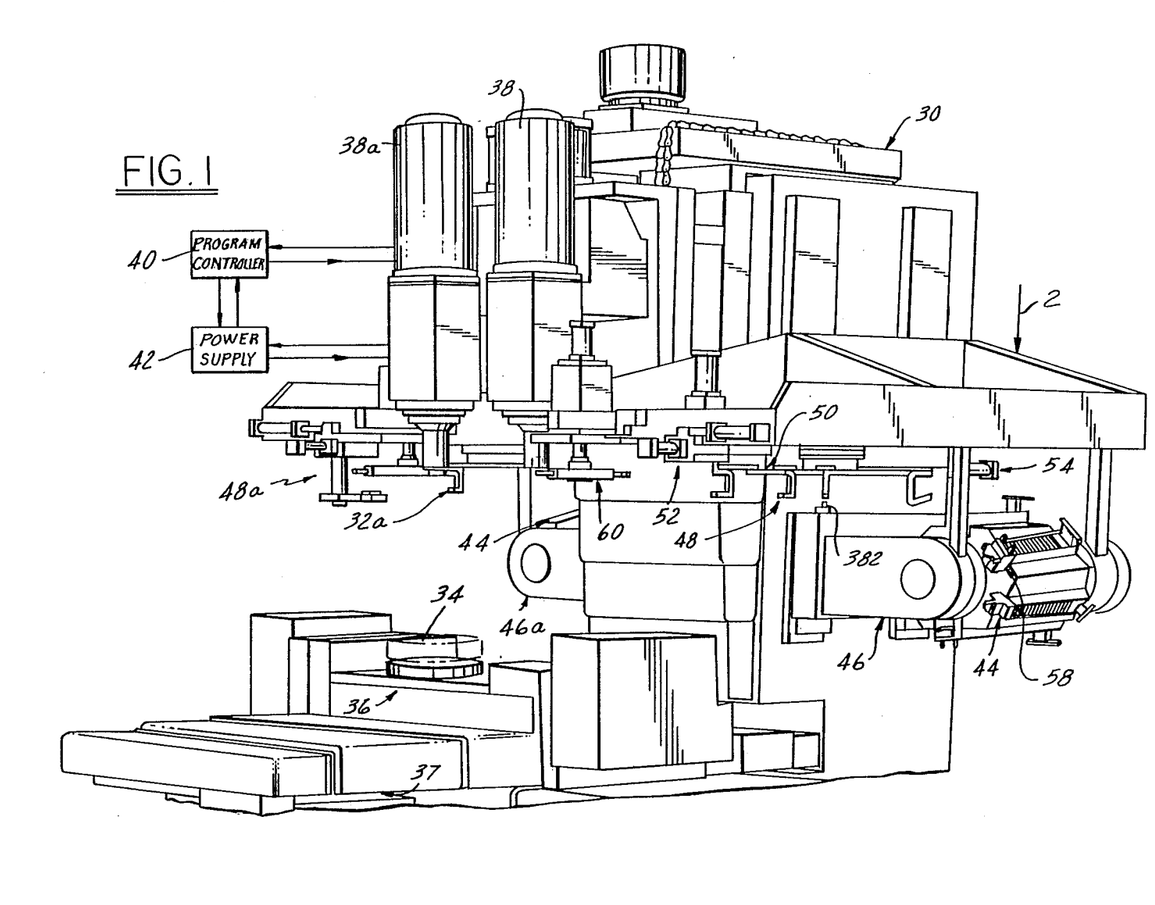
FIG. 1 is a perspective view of an EDM machine including the present invention.

FIG. 1 shows an EDM machine 30 suitable for practicing the flexible manufacture of components by use of an electrical discharge machine (EDM) in which a conductive electrode 32 is positioned with respect to a workpiece 34 fixtured on a multi-axis table 36. The table 36 and its supporting cross slide 37 are adjusted so that different segments of the workpiece 34 are properly presented to the electrode as it is moved by a servo-driven head 38 along the Z axis of the machine. The machine has a programmable controller 40 and a power supply 42 that regulate the current pulses to the electrode to accomplish desired spark erosion of holes in the workpiece. The shape of the holes and their depth are established by the configuration of the electrode tip and the selection of current pulses by the controller 40.

Prior EDM machines have employed plural electrodes on a rotatable drum supported for indexed rotation on the servo drive head of the EDM machine. Other EDM machines have included one cartridge for a single drive head and means to transfer one of a plurality of electrodes from the cartridge directly to a tool holder on the drive head. An example of such a system is set forth in previously cited co-pending U.S. Ser. No. 382,831.

The machine 30 includes two servo-driven heads 38, 38a. Each head has electrodes supplied thereto from a selected one of a plurality of cartridge assemblies 44. Each of the cartridge assemblies 44 for supplying head 38 is supported on a rotatably indexed drum assembly 46. A like drum assembly 46a carries cartridge assemblies 44a which are the source of electrodes for the servo-driven head 38a.

The drum assemblies 46, 46a are each associated with an electrode storage and transfer system 48, 48a (ESTS) respectively arranged in a compact configuration. As shown in FIGS. 1-11, the ESTS 48, 48a each include means for directing one of a plurality of separate electrode streams from the cartridge assemblies 44, 44a. For purposes of this description, the ESTS 48 will be described in detail with it being understood that the ESTS 48a has like components arrayed in a like manner to function identically in moving an individual electrode from one of a plurality of electrode streams defined by the cartridge assemblies 44a on drum assembly 44a.

The ESTS 48 includes a tool holder magazine or carousel 50. The carousel 50 is associated with fore and aft tool holder carriers 52, 54. The carrier 54 transfers a preselected one of a plurality of different tool holder and electrode combinations (combination 56) between the carousel 50 and an electrode supply station at an electrode stripper assembly 58 on each of the cartridge assemblies 44. The carrier 52 is operative to transfer one of the combinations 56 between the carousel 50 and a tool changer assembly 60. The tool changer 60 is operative to remove or locate one of the combinations 56 on the servo-driven head 38.

As best seen in FIG. 3, the tool holder carousel 50 includes a spindle 62, with a driven gear 63 that is keyed to a hub, 64. Hub 64 connects to a driven plate 66 of the tool holder carousel 50. The driven gear 63 is operatively associated with a drive pinion 68 on a shaft 70 on a selectively operated, reversible motor 72 that serves to index the carousel 50 with respect to the carriers 52, 54.

The plate 66 has a plurality of tool holder nests 74 fixedly secured at circumferentially spaced points thereon as shown in FIG. 4. Each nest 74 has a slot 76 faced radially outwardly of the carousel 50. Side arms 78, 80 on each nest have tapered ends 82, 84 that guide tool holder pots 86 into and out of each of the nests 74. Each tool holder pot 86 includes a pair of side slots 88, 90 in which the inboard edges of side arms 78, 80 are received when a pot 86 is located on a nest 74. Each tool holder pot 86 further includes a tapered tool pocket 92 with opposite open ends. The upper end of the pocket 92 opens to a cavity 94 in which a retention spring 96 is located. The spring 96 releasably engages a tool shank 98 on a tool holder 100.

The tool holder shank 98 has a conical surfaced draw bolt 102 which is biased by retention spring 96 so as to seat the tool shank 92 against the pot 86.

The tool holder further includes a bevelled collar 104 located outboard of the seated shank. The collar 104 is adapted to be engaged by the tool changer assembly 60. Concurrently the tool changer assembly 60 engages the tool holder on the servo-driven head 38. The assembly is movable downwardly to remove a selected replacement combination 56 from a pot nest 86 and the replaced combination 56 from a chuck 38c on the head 38.

Each pot 86 has a slotted head 105 that is rotated into operating alignment with either the carrier 52 or carrier 54 depending upon which combinations 56 is selected for exchange by the respective carriers.

A shot pin hole 106 is formed in an inboard segment of each nest 74. Hole 106 is aligned with an index hole 108 located in the carousel 50 at circumferential locations thereon. A shot pin housing 110 is fixed on a support plate 112. Housing 110 has a shot pin cylinder 114 that reciprocates a shot pin 116 into the holes 106, 108 to hold the carousel 50 in the position to which it is indexed by motor 72. Motor 72 is carried by support plate 112.

The spindle 60 has a rotatable limit plate 118 on its upper end that engages limit switches 120 that control drive of the carousel 50 in accordance with its alignment to the carriers 52, 54.

As shown in FIG. 9, the carrier 52 includes a first drive cylinder 122 having a reciprocating shaft 124 with a cross head 126 that engages the slotted head 105 of a pot 86 when it is in alignment with the longitudinal axis of shaft 124. The cylinder 122 is connected to a housing 128 carried on a cross slide 130. The cross slide 130 has its inner races 132 carried by a rail 134 secured to the support plate 112 on its underside to extend perpendicular to the shaft 124. Outer races 136 are supported by the housing 128. A cross slide cylinder 138 (FIG. 8) is fixed on an end plate 140 of support plate 112. Its shaft 142 is connected to an upright 144 on the housing 128 to reciprocate a tool pot 86 after it is removed from the carousel (broken line outline 86a in FIG. 9) along the cross slide 130 to the tool exchange position (broken outline 86b in FIG. 4).

The tool changer assembly 58, as best seen in FIGS. 4–7, includes a tool changer cylinder mount 146 on support plate 112. A 180° drive cylinder 148 is reciprocated on slide 150 secured between mount 146 and upright 152. The cylinder 148 is connected by a platform 154 to a 60° drive cylinder 156.

Figure 5:
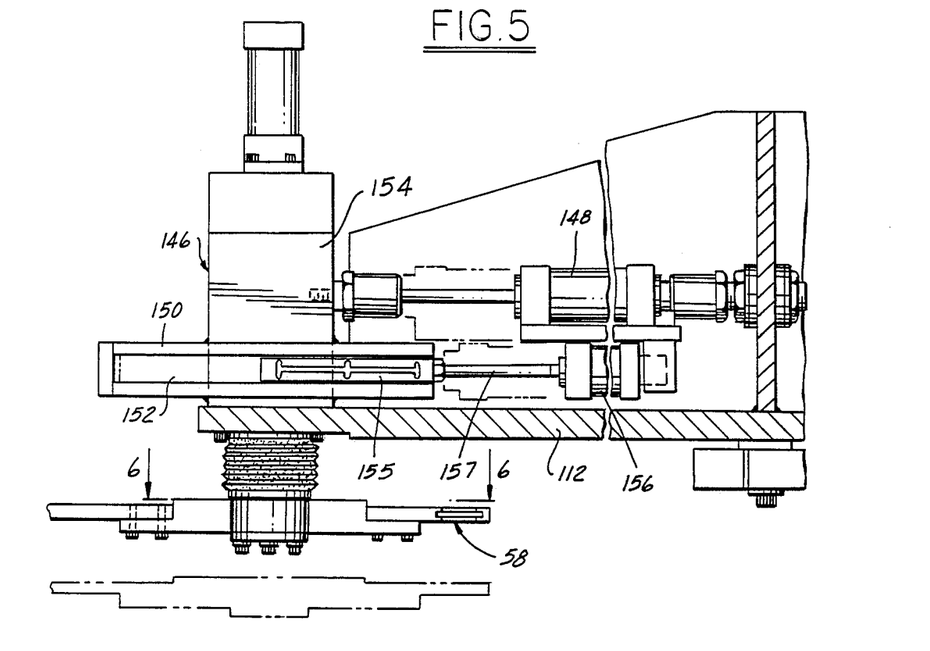
FIG. 5 is an enlarged sectional view taken along the line 5—5 of FIG. 2 looking in the direction of the arrows.
Figure 6:
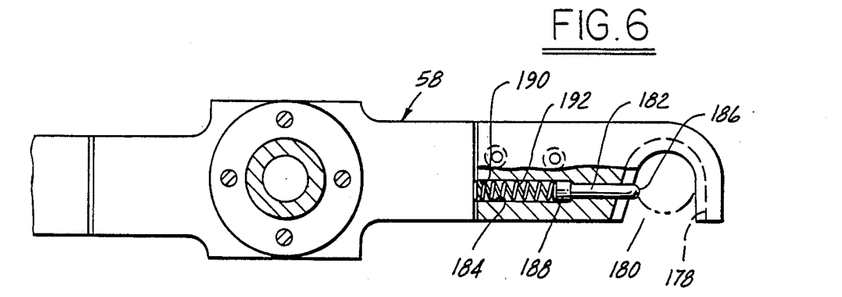
FIG. 6 is an enlarged sectional view taken along the line 6—6 of FIG. 5 with a fragmentary sectioned end.
Figure 7:
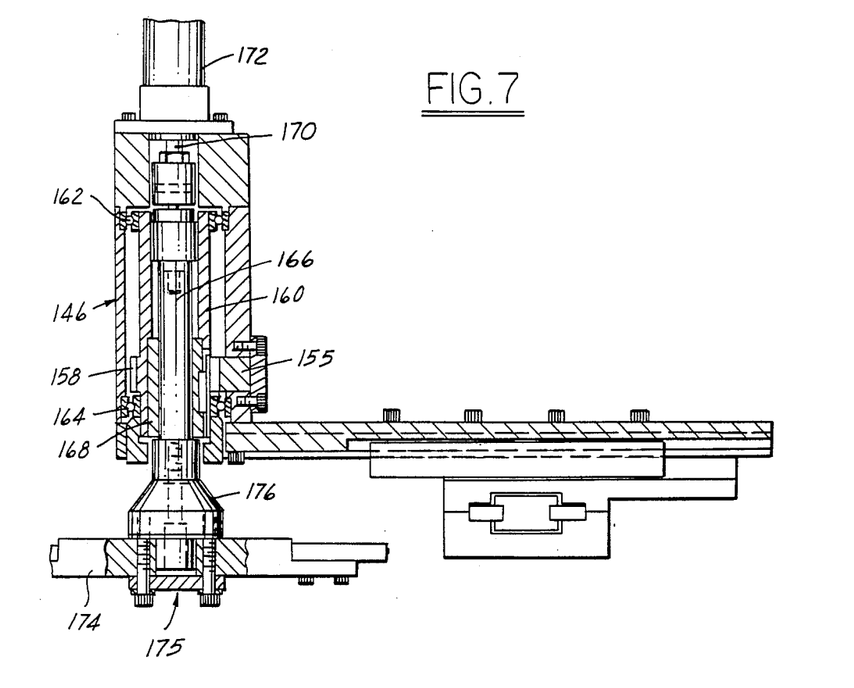
FIG. 7 is an enlarged sectional view taken along the line 7—7 of FIG. 2 looking in the direction of the arrows.
Figure 8:
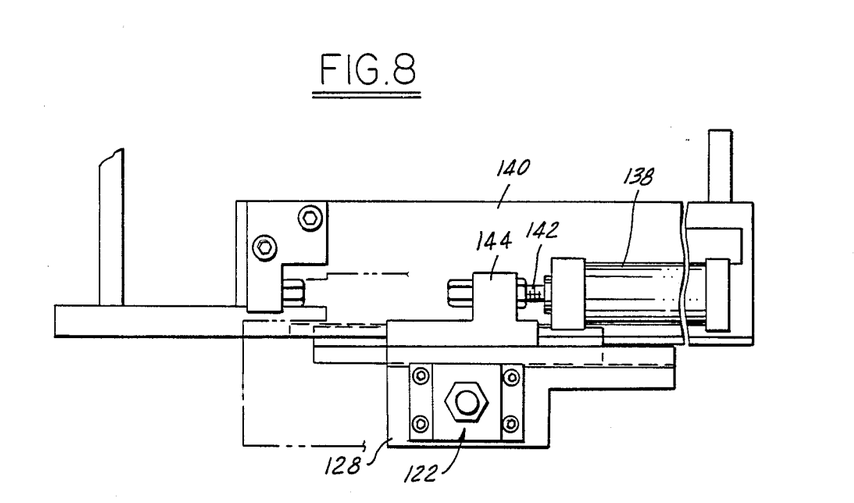
FIG. 8 is an enlarged fragmentary, elevational view looking in the direction of arrow 8 in FIG. 2.
Figure 11:
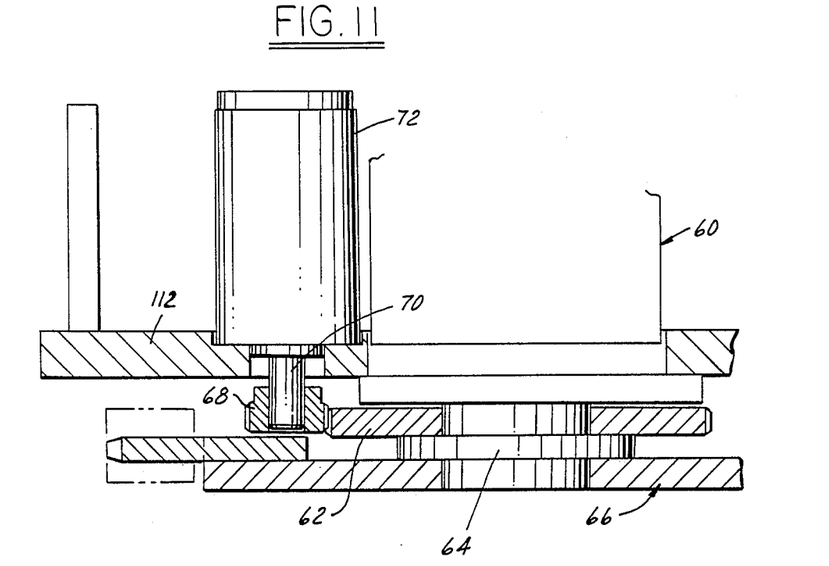
FIG. 11 is an enlarged sectional view taken along the line 11—11 of FIG. 2 looking in the direction of the arrows.

A drive rack 155 for the tool changer assembly 60 is shown in FIGS. 5 and 7. It is connected to a drive shaft 157 of cylinder 156. The drive rack 155 is reciprocated by the cylinder 156 to drive a pinion 158 on an oscillatable hollow shaft 160 (FIG. 7). The hollow shaft 160 is supported for rotation on spindle bearings 162, 164 and it is slidably connected to a drive shaft 166 by a key 168. The drive shaft 166 is connected to the plunger 170 of a cylinder 172 to raise and lower a tool changer arm 174 as shown in FIG. 5 so as to remove and replace tool holders with respect to the tool holder carrier 52 and the servodriven head 38. Drive by cylinder 156 oscillates the arm 174 through 60° to cause the arm to engage and disengage tool holder collars. Combination drive of cylinders 148 and 156 will oscillate the arm through 180° to exchange the position of tools for exchange from/to the head or carrier.

The tool changer arm 174 has a coupling assembly 175 thereon secured to an outboard hub 176 on the end of the drive shaft 166. Each end of the arm 174 has a recessed seat 178 with a side entrance 180. A retainer plunger 182 is supported in a bore 184 to releasably hold a tool holder 100 on each seat 178 as the arm 174 is moved between exchange locations with respect to the carrier 52 and the servo-driven head 38. The plunger 182 has a rounded end 186 that is engageable with a collar 104. An enlarged head 188 on plunger 182 is received in a spring chamber 190. A spring 192 in chamber 190 is engaged with head 188 to bias the plunger 182 against the tool holder.

The tool holder 100 as shown in FIGS. 21–27. It includes an electrode platform 194 on a tool holder extension 196 configured to position the electrode 32 for machining complex workpiece configurations. The configuration of the platform 194 and the extension 196 are varied in accordance with the configuration of a workpiece.

In the illustrated embodiment the platform 194 includes a slideway 197 having a release plate 198 slidably supported therein. The release plate 198 moves with respect to an electrode seat 199. Plate 198 has a bent clamp end 200. The end 200 has an inboard surface 202 which engages spaced ends 204, 206 on the platform 194 to position the release plate 198 in a locked position shown in FIG. 22. The release plate 198 is held in the locked position by a pair of springs 208, 210 carried in a platform cavity 212 and engaging a T-shaped plate 214 connected to the release plate 198 by screws 216. The platform 194 has an actuator slot 217 through which a rounded end 218 of actuator lever 220 extends. The lever 218 is pivoted by pin 222 to the platform and its opposite end 224 is rounded and located in an opening 226 in the release plate 198. By virtue of the above-described arrangement, an upwardly directed force on the lever 220 will cause the end 224 to pivot clockwise as viewed in FIG. 22 to move the release plate 198 outwardly of the platform. As a consequence, a pair of taper pin locators 228, 230 on the clamp end 200 will move into a spaced relationship (shown in FIG. 26) with the platform 194 to open the clamp for injection of an electrode into the platform 194. Thereafter the lever 220 is released and the springs 208, 210 will bias the clamp end 200 into its locked position in which the locators 228, 230 will engage the electrode 32 to force it against individual locator surface 232. The end surface 232 has spaced, tapered relief openings 234 to receive the ends of the locators 228, 230. The taper pins 228, 230 will assure accurate placement of an electrode on the electrode seat 199 and the locator surface 232.

Injection of an electrode 32 into the platform 194 is accomplished by a staged transfer from an electrode stripper assembly 58 on one of the cartridge assemblies 44. The staged transfer includes a positive feed of one of a plurality of electrodes to an electrode transfer station. At the station the selected electrode is first positively clamped and thereafter is transferred up to the platform 194. The stripper transfer motion is reversed. However, before the stripper moves, the clamp is actuated to positively clamp the stripped and transferred electrode to the platform 194.

To accomplish such step-by-step control of the electrode, the present invention includes cartridge assembly 44 with a frame 235 including sides 236, 238 on a base 240. Each side has a longitudinal rail 242 directed inwardly of the frame. Each side further includes recess 244 in which is located a spring 246. Each spring 246 has an end 248 bent around the front end of a side where it is held by a pin 250. The opposite end of each spring 246 is connected to a spring drum 252 mounted on a drum axle 254 in a spring housing 256. The spring housing has side slots 255 each of which receives one of the side rails 242. The housing 256 is thereby supported to be spring biased toward a stripper assembly 58 secured on the front of the frame 234. A proximity switch flag 257 is carried on the housing to indicate when the electrode magazine requires filling.

Figure 20:
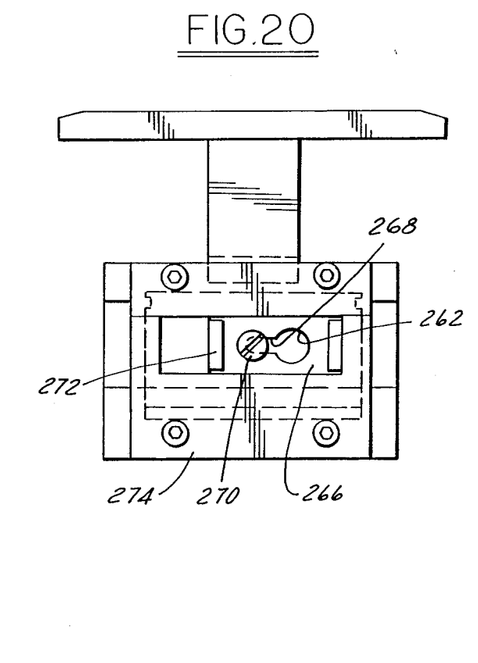
FIG. 20 is an end elevational view looking in the direction of arrow 20 in FIG. 14.
Figure 21:
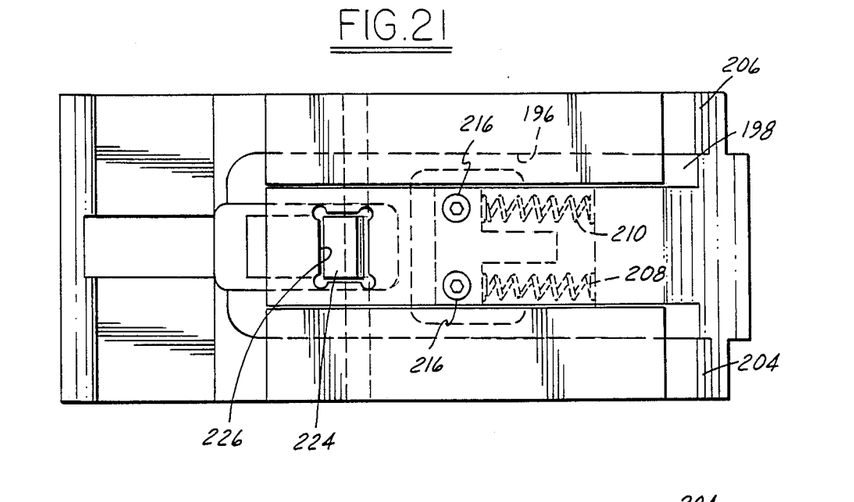
FIG. 21 is a top elevational view of an electrode tool holder of the present invention.
Figure 22:
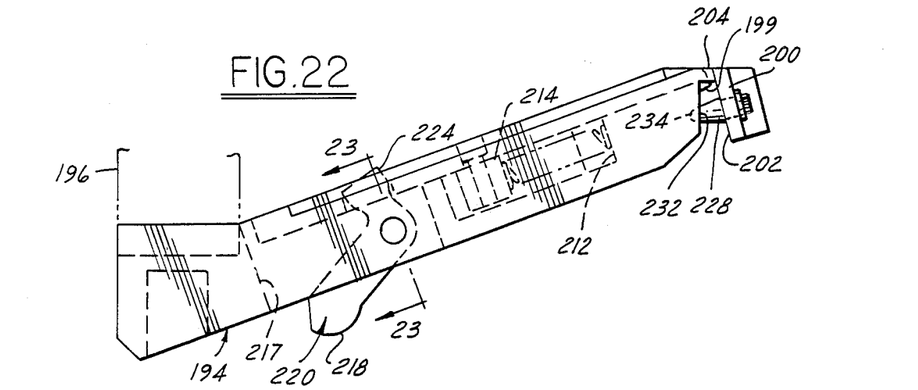
FIG. 22 is a side elevational view of the electrode tool holder of FIG. 19.
Figure 23:
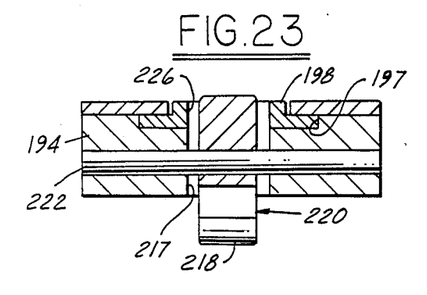
FIG. 23 is a cross-sectional view taken along the line 23—23 of FIG. 22 looking in the direction of the arrows.
Figure 24:
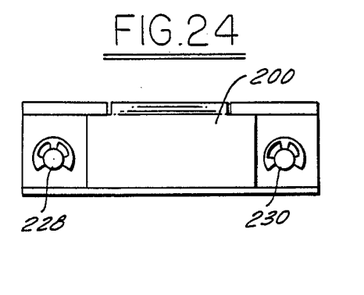
FIG. 24 is an end elevational view of the tool holder looking in the direction of the arrow 24 in FIG. 22.

The housing 256 is shown in a locked position assumed during a fill operation. In this position, a lock screw 258 on its end wall 260 is directed through a hole 262 in a lock plate 264 slidably received in a recess 266. The plate 264 has a slot 268 dimensioned so that the plate 264 will capture and hold the head 270 of lock screw 258 when the plate 264 is positioned as shown in FIG. 20. To release the housing 256, a handle 272 on plate 264 is moved to the left as viewed in FIG. 20 to align hole 262 with the lock screw head 270 so that it will clear the plate 264. A cover 74 holds the plate 264 and includes a slideway 276 for the plate 264.

When the spring housing 256 is released it forces a stream of electrodes 32 toward the stripper assembly 58.

Figure 12:
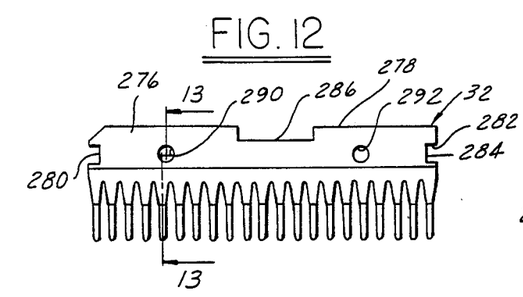
FIG. 12 is a front elevational view of a conductive electrode of the present invention.
Figure 13:
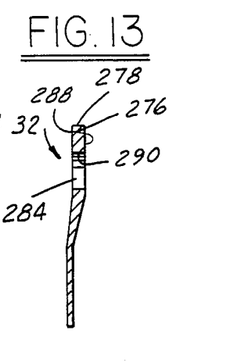
FIG. 13 is a sectional view taken along the line 13—13 of FIG. 12 looking in the direction of the arrows.
Figures 14, 15:
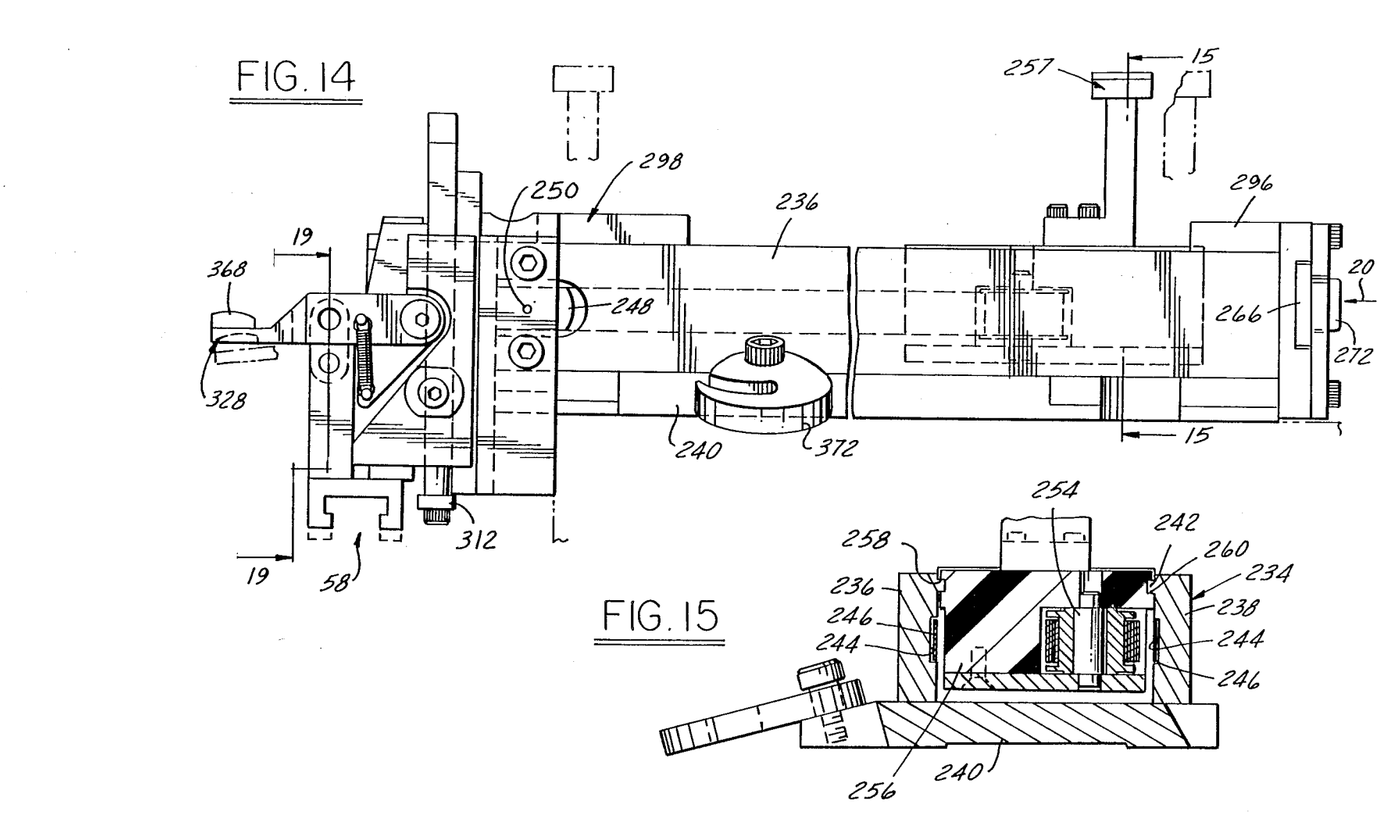
FIG. 14 is a side elevational view of an electrode cartridge assembly constructed in accordance with the present invention.
FIG. 15 is a cross-sectional view taken along the line 15—15 of FIG. 14 looking in the direction of the arrows.

As best seen in FIGS. 12 and 13, each electrode 32 has a head 276 with a top reference surface 278 adapted to be engaged by the electrode seat 199 on the electrode platform 194. The head 276 further includes a slot 280, 282 on its respective ends, each of which defines head slide surfaces 284 supportingly received by the side rails 242. The head 276 includes an offset index groove 286 that will properly position a front reference surface 288 on the electrode 32. The front reference surface 288 and the previously described platform surface 232 coact to position electrode tips of desired configuration at an inclination best suited for a given workpiece configuration. Each electrode 32 further includes a pair of holes 290, 292 that have a diameter which is selected to permit a desired transition movement as the taper pins 228, 230 pick up and shift the electrode 32 into a clamped position on the platform 194.

Figure 19:
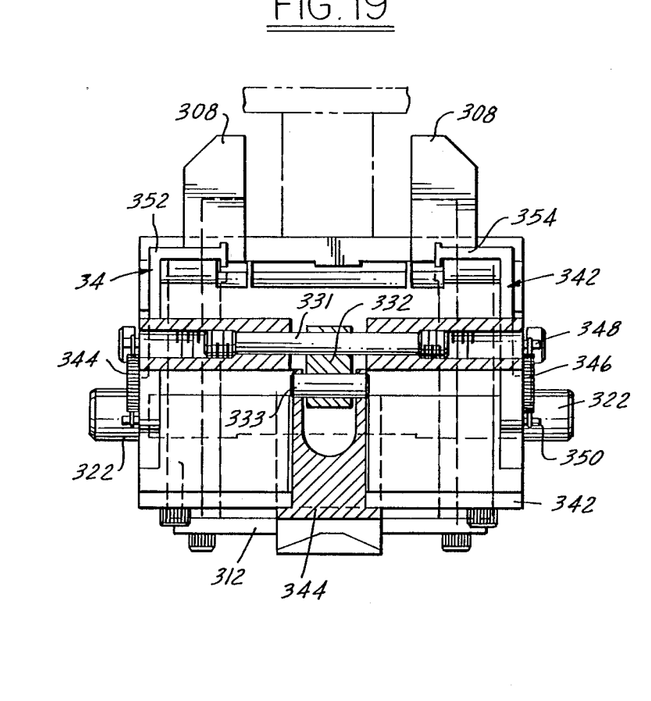
FIG. 19 is a sectional view along the line 19—19 of FIG. 14 looking in the direction of the arrows.

The electrode carriage frame 234 has a pair of bridge members 294, 296 that connect the front and rear ends of the sides 236, 238. The front bridge member 294 has an inboard rib 298 that receives the offset groove 286 to assure proper positioning of the electrode tips. The bridge member 294 further includes a front extension 300 with an outboard surface 302 thereon. A pair of spaced rails 304, 306 are secured to the front end of the sides 236, 238, respectively. Each rail 304, 306 has a vertical track 308 thereon and a slideway 310. The rails 304, 306 are joined by a stop bar 312 that is connected therebetween as best seen in FIG. 19.

Figure 16:
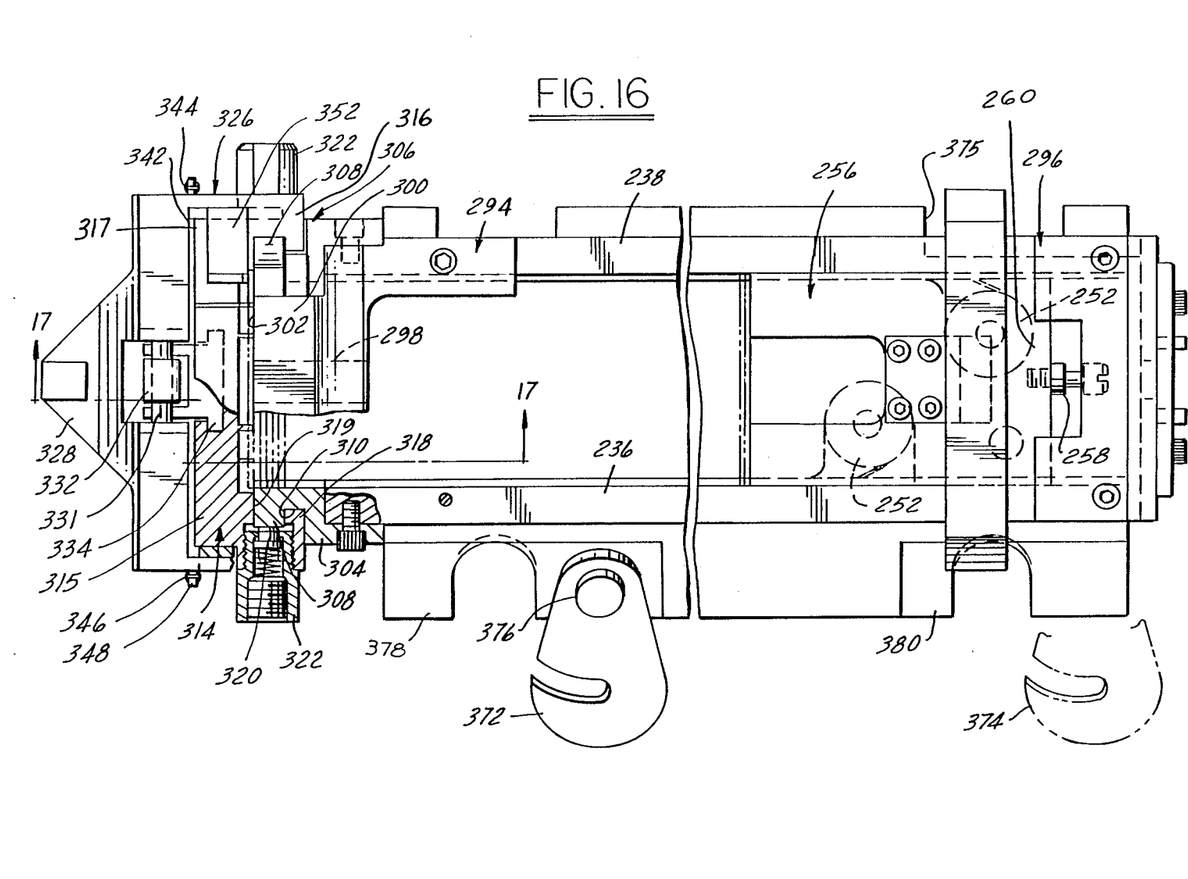
FIG. 16 is a top elevational view of FIG. 14.
Figure 17:
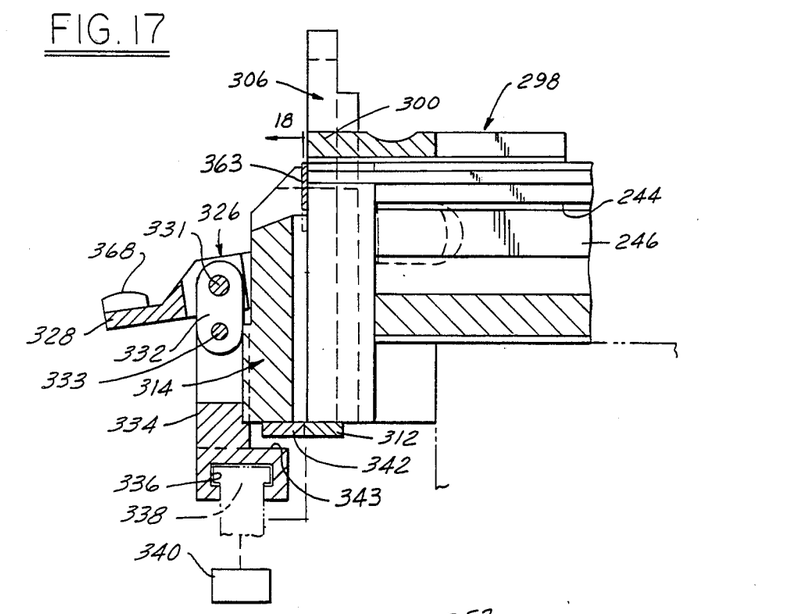
FIG. 17 is a fragmentary sectional view taken along the line 17—17 of FIG. 16 looking in the direction of the arrows.
Figure 18:
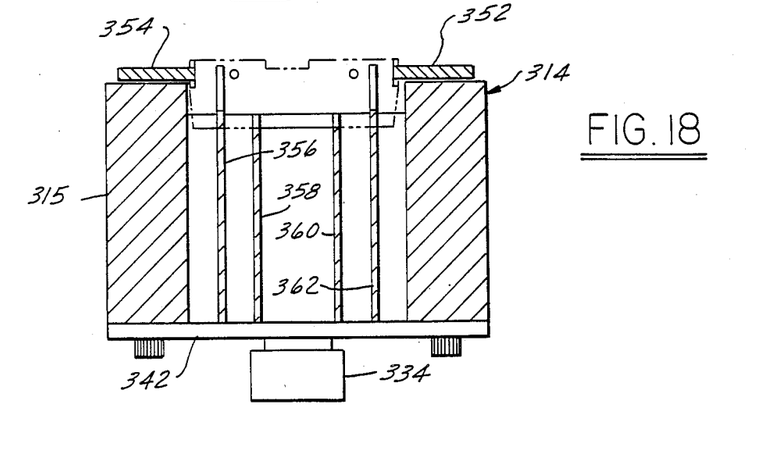
FIG. 18 is a cross-sectional view taken along the line 18—18 of FIG. 17 looking in the direction of the arrows.

A carriage 314 has sides 315, 317 with slideways 319 which receive the tracks 308 whereby the carriage 314 is carried for vertical reciprocation thereon. The carriage 314 includes bent ends 316, 318 that are slidably received in the slideways 310. A drag shoe 320 is carried by an externally threaded housing 322 threaded into the carriage 314 as shown in FIG. 16. Each shoe 320 is biased by a spring 324 against a track 308 to prevent stripper action until a clamp assembly 326 is operated to hold an electrode 32 supplied from the magazine.

The clamp assembly 326 includes an actuator 328 pivoted to carriage 314 by pivot screws 330. The actuator 328 has a pivot pin 331 that is connected to a pivot clamp 332. The pivot clamp 332 is pivoted by a pin 333 to a slide actuator 334 with a cross head groove 336. A cross head 338 of a stripper actuator cylinder 340 is located when a cartridge assembly 44 is located in an electrode stripper transfer position shown in FIGS. 25–27.

The slide actuator 334 is vertically reciprocated by the cylinder 340 with respect to a cross arm 342 on the base of the carriage 314.

When a bearing surface 343 on the slide actuator 334 is raised it contacts the cross arm 342. Further, movement of the carriage 324 is opposed by the resistance of drag shoes 320. The articulation of the pivot clamp 332 moves the stripper actuator 328 and a pair of clamp arms 342. Springs 344, 346 each has its opposite ends connected by pins 348, 350 to each clamp arm 342 and stripper actuator 328 such that they move initially as a unit. During such movement the clamp arm 342 pivots about pivot screw 330 as shown in FIG. 25. When the clamp arm 342 reaches its broken line position, side edges 352, 354 of the arms 342 are located in the side slots 280, 282 of an electrode 32 supplied from the magazine. The electrode 32 is also positioned with respect to a plurality of spaced guide ribs 356, 358, 360, 362 on the inboard face of carriage 314. Ribs 356 and 362 extend above the upper surface 363 of carriage 314 and are slotted to pick up the head of an electrode 32 positioned in the injector assembly. The guide ribs 358, 360 fit into gaps between electrode tips and serve as a lower guide during transfer into the slot ends 363 of the ribs 356, 362.

Once the side edges 352, 354 enter the electrode slots, the clamp is set. The lost motion movement of each springconnected clamp arm 342 and stripper actuator 328 is through an arc from a rest surface 364 on each side of the carriage 314 and a stop surface 366 on each end thereof.

At the very end of the clamp arm travel the actuator 328 assumes the upper dotted line position in FIG. 25 to align a contact pad 368 thereon with the rounded head 218 of lever 220 for operating the release plate 198.

Figure 26:
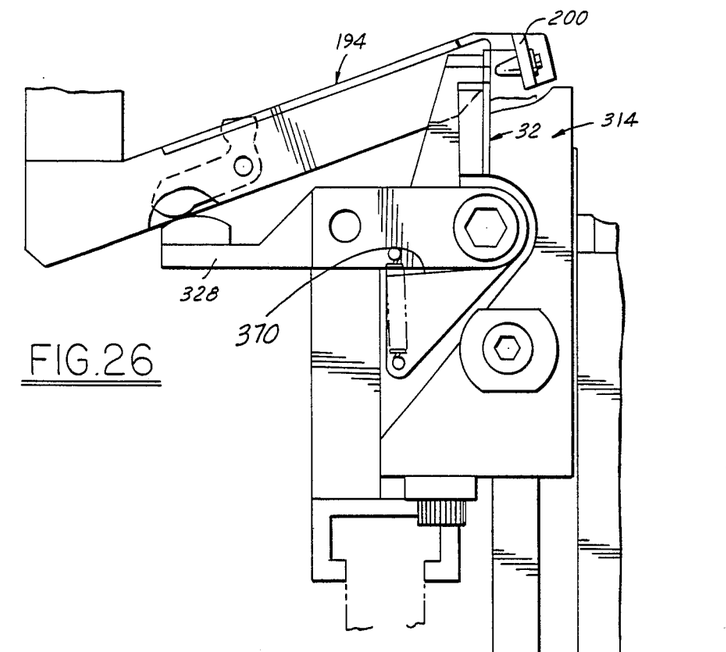
FIG. 26 is a view of the electrode tool holder in its electrode insert position.
Figure 27:
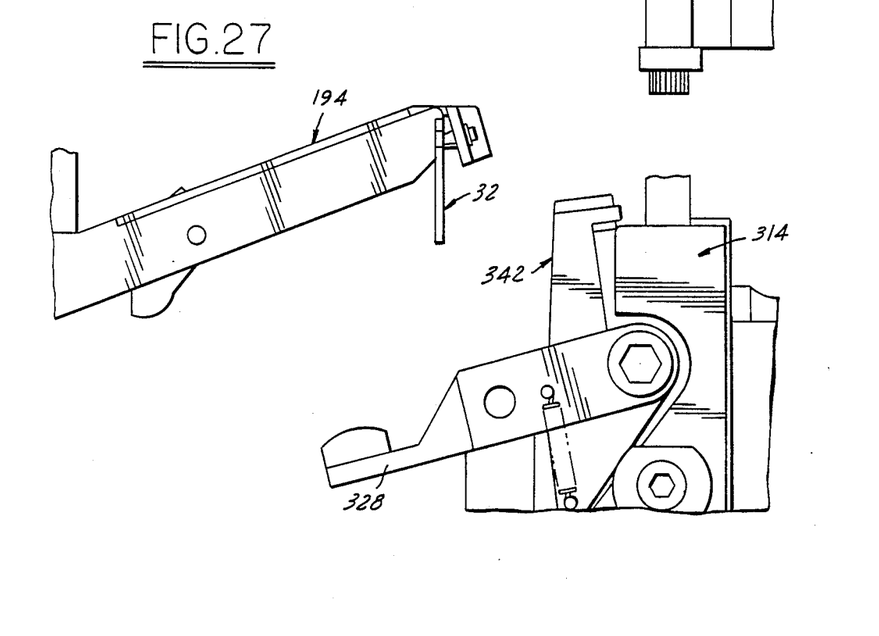
FIG. 27 is a view of the electrode holder in its electrode hold position during transfer to a tool holder carousel.

Further vertical reciprocation of the carriage 314 raises the electrode 32 along the guide ribs 356, 360. The pad 368 engages lever 220 to open the clamp end 200. The electrode 32 enters the space between the ends of taper pins 228, 230 and the surface 232 as shown in FIG. 26 and is referenced against seat 199 and surface 232. Once the electrode 32 is properly seated in the electrode support platform 194 of the tool holder, in accordance with the invention, initial retracting of the stripper actuator 328 will cause it to move through a small lost motion into engagement with a surface 370 on each clamp arm 342. The carriage 314 remains stationary. The slight lost motion of the stripper actuator 328 causes the pad 368 to assume the intermediate position in FIG. 25. At this position the release plate 198 moves to cause clamp end 200 to position the ends of the taper pins 228, 230 in the holes 290, 292 in the electrode base as shown in FIG. 27. Consequently, the electrode is positively secured to the tool holder before the carriage 314 moves downwardly. Downward movement reverses the above-described clamp arm movements until the carriage 314 is returned into a retracted position against the stop bar 312 which serves as a lower stop.

As shown in FIG. 27, when the electrode is clamped on the platform it can be transferred by the carrier 54 away from the stripper assembly 58.

Each cartridge assembly 44 includes a pair of side mounted C-washers 372, 374 each pivoted to the base 240 by shoulder screw 376 and each slidably supported on spaced inclined surfaces 378, 380 on the base 240. The C-washers 372, 374 are connected to suitable retention pins on the drum 44. The base 240 has slots 375 on its opposite ends that are adapted to seat on suitable locating fixtures on the drum 44.

Machine Operation

The operation of the aforedescribed machine will be described with reference to one operating condition which assumes that a used electrode 32 has been released by engagement of a release plunger 382 with the release lever 220 at an electrode release station 384 shown in FIG. 4.

Carousel Index

The carousel 50 is indexed by the motor 72 to position the empty tool holder in alignment with the carrier 54. During carousel rotation, the carriers 52, 54 are conditioned such that the cross head 126 on cylinder 122 is extended as is a cross head 386 on the plunger 388 of a cylinder 390 for operating the carrier 54. Each of the tool holder pots 86 has its slotted head 105 selectively engaged by either the cross head 126 or cross head 386 of the carrier 52 or 54, respectively, as the carousel 50 rotates about its vertical axis.

In the described operation, suitable sensors such as limit switches 120 are operative to position the empty tool holder in alignment with the carrier 54 such that its cross head 386 is seated in the slotted head 105 as shown in FIG. 3. At the same time another combination 56 is positioned so that its tool pot 86 has its slotted head 105 engaged by cross head 126.

Electrode Replacement

An electrode replacement is initiated by carrier 54 moving the tool pot 86 with the empty tool holder 56 into alignment with the electrode exchange reference plane 392 as shown in FIG. 3. The stripper assembly 58 then transfers an electrode 32 from the cartridge 44 to the empty tool holder as shown in the transfer sequence of FIGS. 25-27. One aspect of the present invention is that the electrode being transferred is gripped by the clamp arms 342 on the carriage 314 until the electrode 32 has been engaged by the taper pin locators 228,230. To accomplish this result there is no carriage movement until the clamp arms 342 are engaged. Further, there is no release of the clamp arms 342 until the taper pins 228, 230 are engaged. Consequently, the electrode 32 is unable to slip from the tool holder or be misfed by the stripper assembly during the electrode transfer.

Once the electrode 32 is clamped on the tool holder platform 194, the stripper assembly is retracted against the lower cross bar 312. This positions the cross head 338 at an elevation that allows it to become disengaged from the stripper assembly 58 as the machine is programmed to select a different cartridge assembly 44 as its electrode source. The drum 44 is rotated so that the selected cartridge will be moved into alignment with the electrode transfer plane 390 to carry out a subsequent electrode exchange.

Concurrently, the carrier 54 returns the refitted tool holder electrode combination 56 to an empty nest 76 on the carousel 50.

Tool Holder Transfer

The tool changer 52 can be operated to make a concurrent or separate transfer of a selected combination 56 from carousel to tool changer. The transfer is in two stages. The first stage includes retraction of cylinder 122. This causes the tool pot 86 to move to the broken line position shown in FIG. 3. At this point, a suitable limit switch or other sensors will condition the control to cause cylinder 138 to move the housing 128 on cross slide 130 to the broken line position in FIG. 8. At this point, the collar 104 on the transferred combination 56 is located by the tool pot 86b in a position for pick-up and transfer by the tool changer arm 58 when it is in a raised solid line position shown in FIG. 5. The 60° rack cylinder 156 is extended to cause the arm 58 to swing to the solid line position in FIG. 4. Plunger 182 will engage the the collar 104 to hold the tool on the arm 58. The opposite end of the tool changer 58 picks up the replaced tool in the spindle chuck 38c. The tool changer 58 is then moved to a forward broken line position to remove the tool holder shank 98 from the pot and the replaced tool from the spindle. Then the 180° cylinder is operated to position the replacement tool holder shank below and in line with a chuck 38c on the servo-driven head 38 and the replaced tool holder shank in line with the pot 86b. The cylinder 172 then raises the arm 174 to seat the selected combination 56 in the chuck 36c and the replaced combination in the pot 86b.

The chuck 36c includes actuatable means to hold the combination 56 in the spindle so that the arm 174 can be released and returned to its home position which is clear of Z axis movement of the head 36a. The carrier 52 is then operated in reverse to return the replaced combination to the carousel.

The aforesaid description of operation is with respect to movement of two combinations through representative operating cycles. The reverse motions of each carrier 52, 54 are self-apparent. It is equally clear that each carrier can be selectively conditioned so that its cross head will be positioned to pick up a selected tool pot 86 and combination 56 from the carousel. The removal of tool pots 86 on and off the carousel 50 occurs when the carousel 50 is stepped to the home position shown in FIG. 4.

Various other operation scenarios are possible in accordance with desired machine operations and control programs. The described operations however, demonstrate how selected streams of electrodes can be selectively positioned for transfer to a tool holder combinations so as to make up a selected number of the combinations 56. The combinations 56 are then available on a selected basis for carrying out a wide range of flexible machining operations, depending upon the programmed control of operation of the various drive components of the machine.

What is claimed is:

1. In an electrode storage and feed system for transferring one of a plurality of preselected single element electrodes to a servo driven head, the improvement comprising:
   electrode cartridge support means having an indexable drum indexably operable as the servo driven head is being driven through a machining cycle, a plurality of cartridge support stations on said drum selectively positioned into alignment with a tool holder; positioning means for supporting said tool holder with respect to said drum and in spaced relationship to the servo driven head whereby a workpiece can be positioned and operated in EDM working relationship with respect to the servo driven head as said drum is indexably aligned with a toolholder;

electrode cartridge means on each of said support stations each carrying a plurality of single element electrodes and each including electrode stripper means carried on and movable with respect to said cartridge means for lifting one of said single element electrodes out of contact with said cartridge means;

said positioning means including an electrode tool holder magazine means with a plurality of tool holder pots thereon positionable at a tool holder exchange position and at an electrode exchange position; a tool holder in each of said pots; each of said tool holders including electrode clamp means; tool changer means having two positions, one at said tool holder exchange position and the other at the servo driven head;

first transfer means including means for shifting a preselected tool pot and electrode tool holder from said magazine means and positioning it at said tool holder exchange position; and second transfer means operable independently of said first transfer means and including means for shifting a second predetermined tool pot and electrode tool holder from said magazine means and positioning it at said electrode exchange position.

2. In the combination of claim 1, said tool changer means including means for positioning a tool holder on a preselected tool pot and removing it therefrom and transferring it to a servo driven head.

3. In the combination of claim 1, said magazine means including means operable independently of said tool changer means to position said second predetermined tool pot and tool holder at said electrode feed position; and means for feeding one of a plurality of single element electrodes from said cartridge means to said electrode stripper means.

4. In the combination of claim 1, coacting means on said electrode stripper means and said tool holder to maintain an electrode in full locked engagement with either said stripper means or said tool holder until it is transferred from said carriage means and positively locked in place on said tool holder.

5. In the combination of claim 1, said electrode cartridge support means including a frame and means for feeding a plurality of electrodes to said stripper means from said frame; said electrode stripper means including a guide member reciprocably mounted on said frame and clamp means responsive to reciprocation of said guide member and engageable with an electrode to remove an electrode from said frame.

6. In the combination of claim 1, said magazine means including rotatable carousel having a plurality of pot holder nests each with an outwardly facing slot to receive an electrode holder pot; coacting means on said pot holder nests and said pots for slidably supporting said pots on said holder nests; and first transfer means including means operable to remove a preselected pot from said carousel along a first axis when the carousel is in a first transfer position and to support the pot for transfer along a second axis perpendicular to said first axis to the tool holder exchange position.

7. In the combination of claim 6, said second transfer means including means for removing a second preselected pot from a point diametrically opposite the supported position of the first preselected pot and to position it at the electrode exchange position.

8. An electrode transfer system for receiving a conductive electrode from a cartridge mechanism and for transferring it to a servo driven head comprising: a rotatably indexable tool holder disc having a plurality of open-ended tool pot nests, a tool pot supported in at least two of said nests; coacting means on said tool pot and said tool pot nest slidably supporting said tool pot on said nest for replacement with respect thereto; said tool pots each having handle slots; first transfer means for transferring tool pots to and from a first nest on said disc when said disc is in a first indexed position; said first means including a first cross-head engageable with the handle slots of one of said tool pots as it is rotated by said disc and said first transfer means further including cross-slide means for moving one tool pot axially from its nest and then transversely of the nest when said first cross-head is engaged with one of said handle slots; and second transfer means for transferring the other tool pot to and from a second nest located diametrically opposite said first nest when said disc is in said first indexed position, said second transfer means including a cross-head engageable with the handle slot of the other tool pot as it is rotated by said disc whereby the tool pots are separably located and transferable, respectively, with respect to cartridge mechanism and a servo driven head during flexible EDM machine operating cycles.

9. In a flexible manufacturing EDM machine having a servo driven head for positioning a conductive electrode with respect to a workpiece and power supply means for producing an erosion spark between the electrode and workpiece the improvement comprising: and electrode tool holder magazine having a plurality of electrode holders thereon; means for providing a plurality of continuous in-line multiple replacement electrode stacks of separate single element electrodes; means for selectively stripping single element electrodes from each of said in-line multiple replacement electrode stacks and for connecting each such single element electrode to one of said plurality of electrode holders to provide a predetermined array of electrodes on the tool holder magazine; and means for selectively transferring an individual one of the predetermined array of electrode holder and electrodes from said tool holder magazine to the servo driven head.

10. In a flexible EDM machine having a servo driven head for positioning a conductive electrode with respect to a workpiece and power supply means for providing an erosion spark between the electrode and workpiece and an electrode tool holder magazine having a plurality of electrode tool holders thereon; the improvement comprising: a high capacity reservoir of individual electrodes including a plurality of separate electrode cartridges each with an in-line row of single element replacement electrodes; means for supplying the electrodes from the cartridges; means for releasing used electrodes from preselected ones of said electrode tool holders; stripper means for transferring individual single element replacement electrodes out of engagement with each of said cartridges to selected ones of said electrode tool holders; and means for selecting the electrode cartridge from which an electrode will be transferred by said stripper means to said selected one of said electrode tool holders whereby a variety of electrode types are supplied to an electrode tool holder in said electrode tool holder magazine; and means for transferring selected ones of the selected single element electrode types to the servo drive head in accordance with a desired flexible machining schedule.

11. An EDM electrode cartridge support and transfer system including a cartridge having stripper means thereon for transferring a plurality of blade type electrodes from the cartridge to an electrode tool holder; said cartridge including a magazine means; a plurality of blade type electrodes therein each having a head with spaced side slots therein, said magazine means having spaced parallel longitudinal tracks thereon for support said blade type electrodes at the spaced side slots thereof, said magazine means having an end opening formed therein at the end of said tracks and being located between said tracks for defining an exit from said magazine means for removal of an electrode from said tracks at the ends thereof; said stripper means including a pair of transfer tracks on said magazine means extending perpendicularly to said longitudinal tracks, a guide frame movable on said transfer tracks and including means for supporting a blade type electrode during movement of said guide frame for transferring a blade type electrode transversely of the exit; and load responsive clamp means on said movable guide frame for engaging and lifting a replacement blade type electrode in a direction transversely of said longitudinal track as it moves off said longitudinal tracks, said clamp means continuing to lift said blade type electrode as said guide frame moves on said transfer tracks.

12. In the combination of claim 11, said load responsive clamp means including clamp arms engageable with an electrode during its transfer to a tool holder, and means operative to release said arms from the electrode when it is transferred to a tool holder.

13. In the combination of claim 12, said stripper means further including a movable guide frame and means for producing a predetermined drag force on said guide frame; said clamp arms including a release position and an electrode engage position; lost motion means operable in response to an initial force less than said drag force to insure engagement of said clamp arms for securing the electrode to said guide frame prior to movement thereof.

14. In the combination of claim 13, actuator means slidably supported on the guide frame, means for connecting said actuator means and said clamp arms for moving them between released and engaged positions, said actuator means having an inboard surface, a cross arm on said guide frame, said inboard surface being spaced from said cross arm when the clamp is released, said inboard surface first engaging said cross arm to move said clamp arms from release position to engaged position before said guide frame moves; and said lost motion means including spring means with a force less than that of said drag force, coacting surfaces on said clamp arms and said actuator means held apart by said spring means but engageable by said actuator means to assure that said clamp arms are engaged with an electrode prior to transfer movement of said guide frame.

15. In an electrically conductive blade type replacement electrode for use in a flexible manufacturing EDM machine having a cartridge with movable stripper mechanism including clamp arms to secure a replacement electrode for movement with the stripper mechanism to transfer the replacement electrode to an electrode platform having tapered locators and wherein the cartridge has a pair of parallel longitudinal tracks for supporting the replacement electrode as it moves in the cartridge for transfer therefrom by the stripper mechanism, the improvement comprising: said head having a front reference surface, a top surface and opposite ends, said top surface being shaped to conform to a reference surface in the electrode platform, said head further including a slot on each opposite end defining parallel head slide surfaces adapted to be slidably supported on the parallel longitudinal tracks of the cartridge; said slots further being configured to receive clamp arms on the stripper mechanism for securing the electrode thereto for movement therewith; an index groove in said end surface to orient the front reference surface against the electrode platform for inclining the electrode at a desired angle, holes of a predetermined diameter formed through said head spaced apart from one another and adaptable to receive the tapered locators and adjustable with respect to the locators to adjustably seat the electrode.

16. An EDM electrode cartridge support and transfer system including a cartridge having stripper means thereon for transferring an electrode from the cartridge to an eletrode tool holder; said cartridge including a magazine means with a plurality of electrodes therein, said magazine means having longitudinal tracks thereon for supporting said electrodes and an end opening at the end of said tracks; said stripper means including a guide frame having a pair of transfer tracks and including means for supporting an electrode during transfer movement of said guide frame; load responsive clamp means for holding a replacement electrode on said guide frame during transfer movement of said guide frame, a tool holder having a mechanically actuated electrode release lever, said load responsive clamp means including means engageable with said release lever for conditioning a tool holder to receive a replacement electrode and said last mentioned means being operative to release an electrode from said load responsive clamp means when the electrode is transferred to the tool holder.

17. In the combination of claim 16, said movable guide frame including means for producing a predetermined drag force between said guide frame and said transfer tracks; said clamp means including a release position and an electrode engage position; lost motion means operable in response to an initial actuation force less than said drag force to insure engagement of an electrode by said clamp means for securing the electrode to said guide frame prior to movement thereof on said transfer track thereby to prevent actuation of said injector means without transfer of an electrode from said cartridge to a tool holder.

18. In the combination of claim 17, a clamp and guide frame actuator means slidably supported on the guide frame, means for connecting said actuator means and said clamp for moving it between its released and engaged positions, said actuator means having an inboard surface, a cross arm on said guide frame engageable with said actuator, said inboard surface being spaced from said cross arm when the clamp is released, said inboard surface first engaging said cross arm to move said clamp from its release position to its engaged position before said guide frame moves; and said lost motion means including spring means with a force less than that of said drag force, coacting surfaces on said clamp and said actuator means held apart by said spring means but engageable by said actuator means to assure that said clamp is engaged against an electrode prior to transfer movement of said guide frame.

* * * * *